United States Patent
Ando et al.

[11] Patent Number: 6,153,825
[45] Date of Patent: Nov. 28, 2000

[54] SUPERCONDUCTING CURRENT LEAD

[75] Inventors: Toshinari Ando; Hiroshi Tsuji; Takaaki Isono, all of Naka-machi; Yukio Yasukawa, Kawasaki; Kizen Sakaki, Kawasaki; Masayuki Konno, Kawasaki; Takeshi Kato; Kazuhiko Hayashi, both of Osaka, all of Japan

[73] Assignees: Japan Atomic Energy Research Institute, Tokyo; Fuji Electric Co., Ltd., Kanagawa; Sumitomo Electric Industries, Ltd., Osaka, all of Japan

[21] Appl. No.: 08/998,434

[22] Filed: Dec. 26, 1997

[30] Foreign Application Priority Data

Dec. 27, 1996 [JP] Japan ................................ 8-350078

[51] Int. Cl.⁷ .................................................. H01B 12/06
[52] U.S. Cl. ...................... 174/15.4; 174/15.5; 335/216; 505/231; 505/232; 505/872; 505/885
[58] Field of Search .................... 174/15.4, 15.5, 174/125.1; 335/216, 230; 505/231, 232, 239, 872, 875, 885

[56] References Cited

U.S. PATENT DOCUMENTS 5,276,281  1/1994  Sato et al. ............................ 174/125.1

FOREIGN PATENT DOCUMENTS

| 0 412 442 | 7/1995 | European Pat. Off. . |
| 64-76707 | 3/1989 | Japan . |
| 4-218215 | 8/1992 | Japan . |
| 5-109530 | 4/1993 | Japan . |
| 5-144635 | 6/1993 | Japan ..................................... 505/430 |
| 5-335145 | 12/1993 | Japan . |
| 6-103846 | 4/1994 | Japan . |
| 7-272921 | 10/1995 | Japan . |

*Primary Examiner*—Hyung-Sub Sough
*Attorney, Agent, or Firm*—Pearne & Gordon LLP

[57] ABSTRACT

A superconducting current lead includes a cylindrical support member 3, and superconducting wire material units 1 each of which is fixed onto the support member and each of which is composed of a single tape-like oxide superconducting wire material or a laminated tape-like oxide superconducting wire material, wherein tape surf aces of the superconducting wire material units are disposed in parallel with a circumferential direction in a cylindrical coordinate system, and the cylindrical support member is formed from a low thermal conductivity material.

3 Claims, 3 Drawing Sheets

FIG. 2
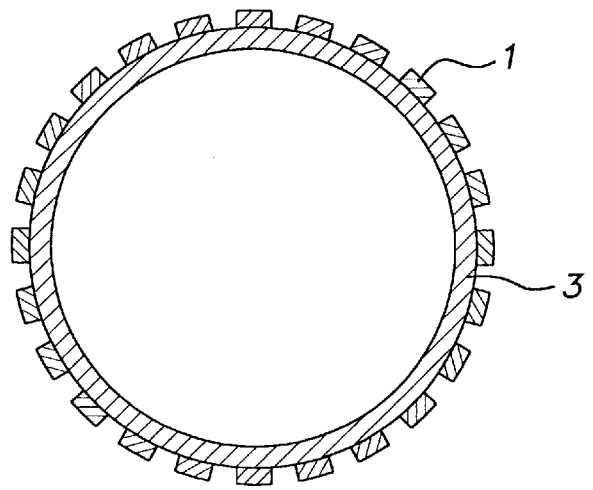
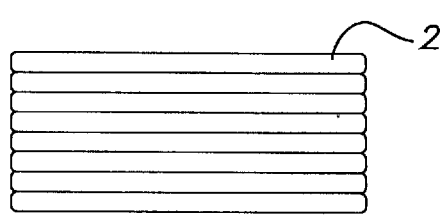
FIG. 3
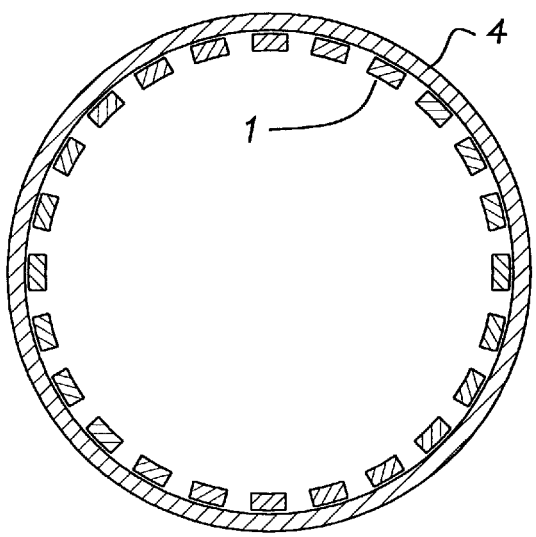
FIG. 5

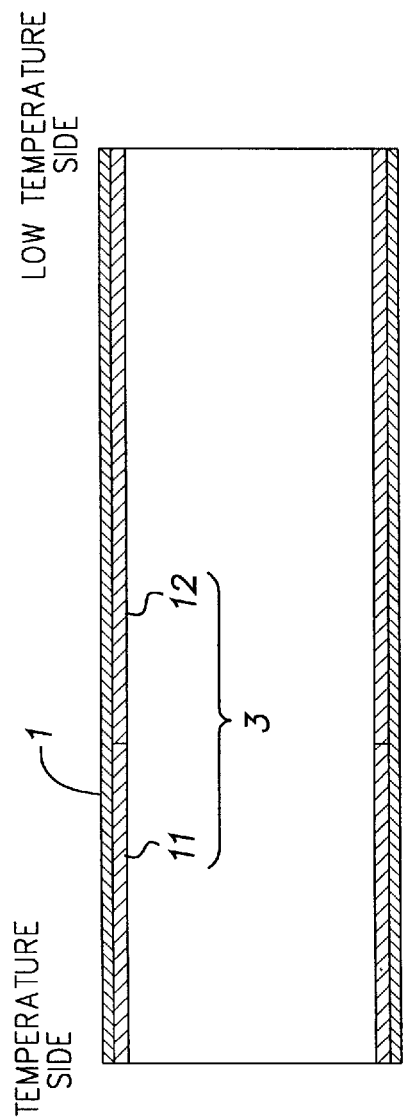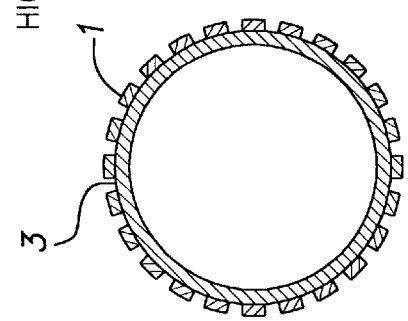
FIG. 4A
FIG. 4B
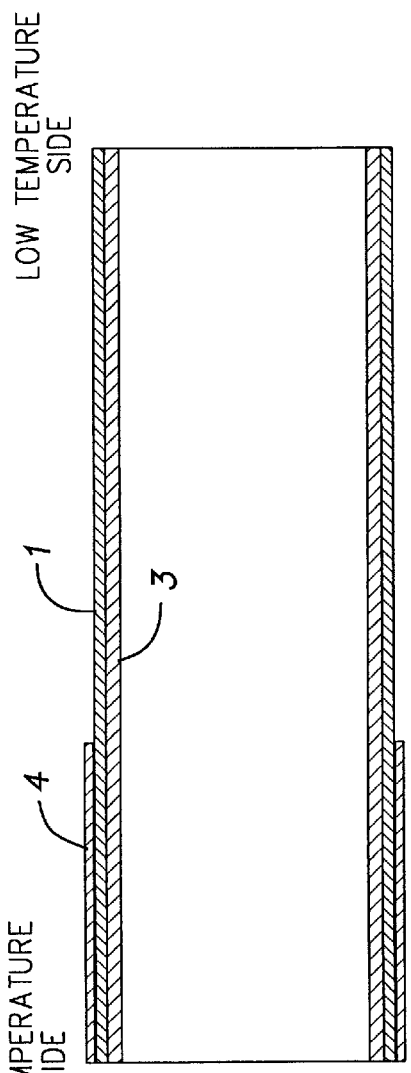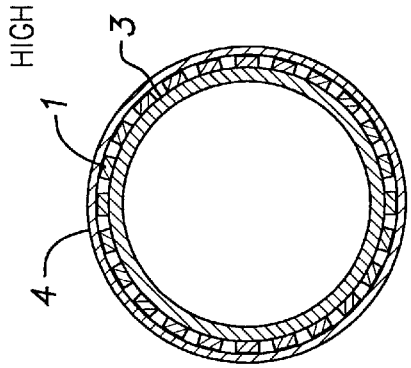
FIG. 6A
FIG. 6B

SUPERCONDUCTING CURRENT LEAD

BACKGROUND OF THE INVENTION

1. Field of the Invention

The present invention relates to a superconducting current lead for supplying a current to a superconducting apparatus such as a superconducting magnet, or the like, cooled to a very low temperature by a power supply disposed at the room temperature.

2. Description of the Related Art

Superconducting magnets are used for research of physical properties or in magnetic resonance apparatuses, etc. and, in the future, such superconducting magnets are to be applied to magnetic levitated trains, nuclear fusion magnetic containment apparatuses, etc. Each of these superconducting magnets placed at a very low temperature, however, has a problem that heat penetrates a very low temperature region when a power supply placed at the room temperature supplies a current to the superconducting magnet. For example, liquid helium is an expensive liquid the price of which is no less than 1000 yen per liter. Furthermore, the refrigerator input electric power required for the refrigerator to re-liquefy liquid helium vaporized by penetration of 1 W heat is about 400 W even in an ideal condition and may reach 1000 W in a practical condition. For this reason, if the quantity of penetration of heat through the current lead is large, not only the cost increases with the purchase of liquid helium, or the like, but also the size and capacity of the refrigerator for re-liquefying increase. There would be no sense in using a current lead for a superconducting magnet which is intended to be reduced both in size and in electric power.

Therefore, the development of a low heat penetration type current lead has become an important development theme. With the discovery of oxide superconducting materials, a current lead using an oxide superconducting material disposed on the low temperature side of the current lead to reduce the quantity of penetration of heat into a very low temperature portion has been developed. For example, in Japanese Patent Unexamined Publication No. Sho-64-76707, an intermediate portion of a current lead for supplying a current to a superconducting apparatus in liquid helium is used as a thermal anchor for cooling to the temperature of liquid nitrogen, so that a superconductor (for example, Y—Ba—Cu—O) having a critical temperature of not lower than the boiling point (78 K) of Liquid nitrogen is used as a material for a lead portion between the thermal anchor and the superconducting apparatus. Further, in Japanese Patent Unexamined Publication No. Hei-5-109530, a superconducting portion of a current lead is composed of different kinds, for example, three kinds of conductors, that is, composed of a low temperature portion, an intermediate temperature portion, and a high temperature portion, which are connected to one another in a lengthwise direction by connection members. These low, intermediate and high temperature portions are different from one another in shape, superconducting characteristic (critical current density (Jc), critical temperature, resistance value in larger current density than Jc, and magnetic field and temperature dependences thereof) and composing method. The publications shows examples of materials for these low, intermediate and high temperature portions as follows. A conductor in which a Bi oxide superconductor layer having a high critical current density in a magnetic field intensity at 4.2 K is provided through a thin layer of Ag on a low thermal conductivity insulating substrate as a reinforcing material is used as the low temperature portion conductor. A conductor in which tape-like wire materials each composed of a core of an oxide superconductor coated with a coating material are collectively laminated is used as the intermediate temperature portion conductor. A yttrium oxide superconductor having a high critical current density (Jc) in 77 K is used as the core. An alloy composed of Au, and a small quantity of Pd added to Au is used as the coating material in order to suppress heat penetration. A conductor in which tape-like wire materials each composed of a core coated with a coating material are laminated and collected in the same manner as in the intermediate temperature portion is used as the high temperature portion conductor, in which a Tl oxide superconductor high in critical temperature is used as the core, and Ag small in resistance is used as the coating material. As described above, a material small in thermal conductivity is used in the vicinity of a superconducting magnet to thereby reduce heat penetration due to conduction. Further, in Japanese Patent Unexamined Publication No. Hei-4-218215, silver sheath oxide superconductors and a pipe formed of fiber reinforced resin material or of silver, copper, aluminum, nickel, stainless steel, an alloy thereof, etc. as a support member combined with the oxide superconductors are provided. The oxide superconductors and the pipe are stuck to each other by an adhesive agent layer or wound with a Teflon tape, or the like, so as to be fixed, by which the oxide superconductors and the support member move integrally at the time of thermal expansion and at the time of thermal contraction to fulfill stable superconducting characteristic against stress. In this case, the oxide superconductors are disposed so as to be parallel or helical in a longitudinal direction of the current lead.

On the other hand, the high temperature side of the current lead is, in most cases, constituted by a copper lead.

The conventional current lead using oxide superconductors, however, has the following problem. If the capacity of the current lead increases, that is, if the current value Increases, the self magnetic field generated by the current lead per se is intensified. The superconducting material used is classified into a bismuth type material and an yttrium type material. In each material, the critical current value in a magnetic field decreases extremely. Accordingly, in a large-current-purpose current lead using a bulk-like superconducting material having a uniform critical current density in the material, the necessary sectional area of the superconducting material increases. There arises a defect in that not only the superconductor portion of the current lead increases in size and becomes complex but also the quantity of heat penetration increases. The problem in lowering of the critical current value due to the self magnetic field has been not noticed in the prior art.

SUMMARY OF THE INVENTION

The present invention is intended to solve the aforementioned problem and an object thereof is to provide a superconducting current lead which has a critical current value prevented from being lowered and which is made compact.

The basic characteristic of the present invention is in that the critical current value of a tape-like superconducting wire material (for example, an oxide superconducting wire material coated with silver) is not so greatly reduced with respect to the magnetic field applied in parallel with the tape surface.

That is, according to the present invention, the superconducting current lead is configured as follows.

(1) A plurality of superconducting wire material units each of which is fixed onto a cylindrical support member and each of which is composed of a single tape-like oxide superconducting wire material or a laminated tape-like oxide superconducting wire material, such that the tape surfaces of the superconducting wire material units are disposed in parallel with a circumferential direction In a cylindrical coordinate system. By this measure, the main component of the self magnetic field generated by the self current is parallel with the tape surfaces of the superconducting wire materials. Accordingly, the magnetic field components perpendicular to the tape surfaces are reduced so that the lowering of the critical current value due to the self magnetic field can be reduced. Further, because the tape surfaces of the superconducting wire material units such as silver sheath superconducting wire material units, or the like, are fixed securely in the circumferential direction by the support member, the self magnetic field generated is not disordered so that the critical current value can be kept as designed. Further, the cylindrical support member is formed from a low thermal conductivity material. By this measure, the quantity of penetration of heat into the low temperature portion can be reduced.

(2) A plurality of superconducting wire material units each of which is fixed onto a cylindrical support member and each of which is composed of a single tape-like oxide superconducting wire material or a laminated tape-like oxide superconducting wire material, such that the tape surfaces of the superconducting wire material units are disposed in parallel with a circumferential direction in a cylindrical coordinate system. By this measure, the main component of the self magnetic field generated by the self current becomes parallel with the tape surfaces of the superconducting wire materials. Accordingly, the magnetic field components perpendicular to the tape surfaces are reduced so that the lowering of the critical current value due to the self magnetic field can be reduced. Further, because the tape surfaces of the superconducting wire material units such as silver sheath superconducting wire material units, or the like, are fixed securely in the circumferential direction by the support member, the self magnetic field generated is not disordered so that the critical current value can be kept as designed.

Here, a magnetic material is used as the support member. By this measure, harmful magnetic field components which are perpendicular to the tape surfaces and which cause the lowering of the critical current value due to the self magnetic field generated by the self current in the superconductors can be reduced more greatly through the magnetic material.

(3) Further, in the superconducting current lead described in the paragraph (2), the support member is configured so that a magnetic material is disposed on its high temperature side, and a low thermal conductivity material is disposed on its low temperature side and connected to the magnetic material. By this measure, not only the magnetic field components perpendicular to the tape surfaces can be reduced to keep the critical current value high but also the quantity of penetration of heat into the low temperature side can be suppressed.

(4) Further, in the superconducting current lead described in the paragraph (2), the support member is disposed on the outer circumferential side of the superconducting wire material units so as to surround the superconducting wire material units. By this measure, the magnetic field components perpendicular to the tape surfaces can be reduced more effectively to make it easy to keep the critical current value high.

(5) Further, in the superconducting current lead described in any one of the paragraphs (1) through (4), a magnetic material is disposed so as to surround the support member and the superconducting wire material units each of which is composed of a single tape-like oxide superconducting wire material or a laminated tape-like oxide superconducting wire material. By this configuration, the tape surfaces of the superconducting wire materials are fixed securely in the circumferential direction by the support member. Accordingly, the self magnetic field generated is not disordered so that the self magnetic field generated to be perpendicular to the tape surfaces can be reduced greatly through the magnetic material disposed in the outer circumference. By this measure, the critical current value can be kept free from deterioration.

The above and other objects and features of the present invention will be more apparent from the following description taken in conjunction with the accompanying drawings.

BRIEF DESCRIPTION OF THE DRAWINGS

FIG. 2 is a cross sectional view showing a superconducting current lead according to one embodiment of the present invention;

FIG. 3 is a sectional view of a tape-like superconducting wire material provided as a unit according to another embodiment;

FIGS. 4A and 4B are transverse and longitudinal sectional view showing the superconducting current lead according to still another embodiment of the present invention, respectively;

FIG. 5 is a cross sectional view showing the superconducting current lead according to still another embodiment of the present invention; and FIGS. 6A and 6B are transverse and longitudinal sectional views showing the superconducting current lead according to still another embodiment of the present invention, respectively,

DETAILED DESCRIPTION OF THE PREFERRED EMBODIMENTS

Figure 1:
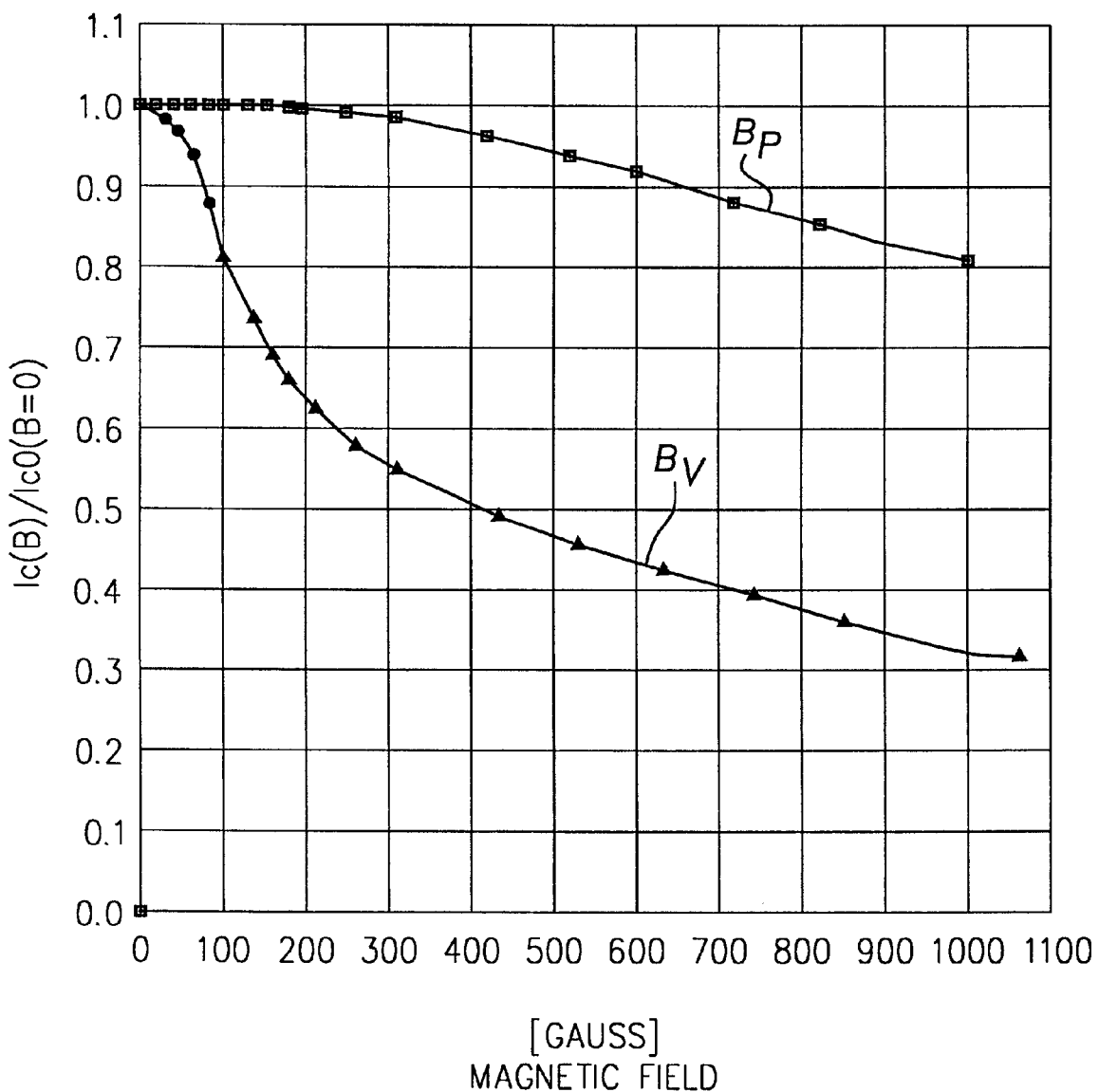
FIG. 1 is a graph showing the dependency of the critical current value on the applied magnetic field in a silver sheath superconducting wire.

Preferred embodiments of the present invention will be described below in detail with reference to the accompanying drawings, but the present invention is not limited to these modes.

Those which are used as oxide superconducting wire materials according to the present invention are, preferably, superconductors used as silver sheath superconducting wire, such as bismuth type materials (Bi—Sr—Ca—Cu—O), yttrium type materials (Y—Ba—Cu—O), etc. In this case, the ratio of the sectional area of silver to the superconductor is preferably from about 2 to about 3.

FIG. 1 is a graph showing the relation between a magnetic field applied to the silver sheath superconducting wire and the critical current value thereof. In the drawing, Bp shows a curve expressing the change of the critical current value depending on the magnetic field parallel with the tape surfaces, and Bv shows a curve expressing the change of the critical current value depending on the magnetic field perpendicular to the tape surfaces. In the ordinate axis, the critical current value is expressed as the ratio of the critical current value Ic (B) in the magnetic field B applied to the critical current value Ic0 in the magnetic field 0 (B=0). As shown in the drawing, the critical current value in the magnetic field of 100 gauss perpendicular to the tape surfaces is reduced to 80% compared with the case of no magnetic field. In the magnetic field of about 500 gauss, the critical current value is reduced to a value less than 50% compared with the case of no magnetic field. On the other hand, the critical current value in the magnetic field of 500 gauss parallel with the tape surfaces is kept 95% compared with the case of no magnetic field. That is, the critical current value in the silver sheath type superconducting wire has extreme dependence on the direction of the applied magnetic field. Here, 500 gauss is substantially a value of self magnetic field generated in the case where an oxide superconductor current lead of the order of tens of kA is to be formed. Incidentally, any metal may be used as the sheath material (stabilizing metal) so long as the metal does not make an undesirable reaction with the oxide superconductor. For example, silver or a silver alloy may be used as the sheath material.

FIG. 2 is a cross sectional view showing a superconducting current lead according to a first embodiment of the present invention. As shown in FIG. 2, the tape surfaces of the tape-like oxide superconducting wire material units 1 are disposed around the cylindrical support member 3 so as to be parallel with the circumferential direction in a cylindrical coordinate system.

Further, FIG. 3 shows a sectional view of a tape-like superconducting wire material provided as a unit according to a second embodiment of the present invention. In FIG. 3, eight single wires 2 of the oxide superconducting wire material are laminated. The critical current value in the laminated wire is not eight times the critical current value in the single wire but is reduced. This is because the self magnetic field components perpendicular to the tape surfaces increase so that the critical current value decreases. When such laminated superconducting wire material units are disposed so that the tape surfaces of the superconducting wire materials are parallel with the circumferential direction in a cylindrical coordinate system, the self magnetic field components perpendicular to the tape surfaces and generated by the silver sheath superconducting wire materials per se are canceled by the magnetic field generated in the adjacent superconducting units. Accordingly, the perpendicular magnetic field component are reduced. In this manner, the lowering of the critical current value due to the self magnetic field is prevented so that stable current conduction can be made while the critical current value is kept high.

The support member is formed from a low thermal conductivity material. The thermal conductivity at the low temperature end portion of the current lead is preferably not larger than 1 W/mK. Examples of the low thermal conductivity material for the support member include stainless steel, a nickel alloy, a titanium alloy, fibre reinforced plastics, etc.

On the other hand, when the superconducting wire materials are fixed to the support member, the following effect can be also expected. In this case, a metal is preferably used as the support member. That is, surfaces of the support member and the superconducting wire material are brought into close contact with each other (binding from the outer circumferential side or integrating by diffusion bonding is effective) so that the contact resistance becomes electrically and thermally sufficiently small. In the case where the state of the superconductor is changed (quenched) from a superconducting state to a normal conducting state, a current flows in silver which is a stabilizing metal. In this occasion, the temperature of the silver sheath superconducting wire material rises due to the Joule heating. Here, because the support member and the silver sheath superconducting wire material are in thermally sufficient contact with each other, both the silver sheath superconducting wire material and the support member can be expected to contribute to the heat capacity. Accordingly, the temperature rising is suppressed compared with the case where only the silver sheath superconducting wire material is used singly. That is, there is an advantage that the support member also serves to protect the superconducting wire material at the time of quenching.

On the other hand, in the superconducting current lead according to the second mode for carrying out the present invention, in the case where a magnetic material is used as the support member, the magnetic field components perpendicular to the tape surfaces of the superconducting wire materials can be reduced considerably. By this measure, the lowering of the critical current value can be suppressed very effectively, so that a current lead which is compact and in which a large current can flow can be provided. Examples of the magnetic material include iron, silicon steel, inconel, incolloy, etc.

FIGS. 4A and 4B are transverse and longitudinal sectional views showing a superconducting current lead according to a third embodiment of the present invention, respectively. As shown in the drawings, the support member 3 is constituted by a high temperature side magnetic material 11, and a low temperature side low thermal conductivity material 12.

The magnetic material 11 and the low thermal conductivity material 12 are connected to each other by welding, adhering, solderless bonding, mechanical fastening, etc. Incidentally, the critical current value increases as the temperature falls. At a high temperature of about 77 K, the critical current value of the superconducting material is as large as about half the critical current value at 64 K. Accordingly, in order to keep the critical current value high in the high temperature region, the magnetic material is disposed in this position so that the magnetic field components perpendicular to the tape surfaces are suppressed. In the low temperature region of the current lead, the magnetic field components perpendicular to the tape surfaces need not to be suppressed because the critical current value per se becomes high. Placing the low thermal conductivity support in this region is rather advantageous. That is, because the thermal conductivity of the magnetic material such as iron, silicon steel, inconel, incolloy, etc. is large in a range of from several times to 10 times or more compared with that of fibre reinforced plastics or a stainless steel material, the quantity of penetration of heat into the low temperature end portion increases undesirably for the current lead. Therefore, a low thermal conductivity material is used as the support member in a region of 64× or less.

FIG. 5 is a cross sectional view showing a superconducting current lead according to a fourth embodiment of the present invention.

As shown in the drawing, the magnetic material 4 is disposed around the superconducting wire material units 1 so as to surround the superconducting wire material units 1. In other words, the units 1 are disposed on the inner circumferential surface of the cylindrical magnetic material so as to be parallel with the circumferential direction in a cylindrical coordinate system. The circumferential self magnetic fields generated by the superconductor takes the maximum value in the outer circumferential side of the superconductors and takes substantially zero in the inner circumferential side. As is obvious from this fact, when the magnetic material is disposed in the outer circumferential side of the superconductor, the magnetic field components perpendicular to the tape surfaces of the superconductors can be suppressed more effectively.

FIGS. 6A and 6B are transverse and longitudinal sectional views showing a superconducting current lead according to a fifth embodiment of the present invention, respectively.

In this case, the superconducting wire materials 1 are fixed around the support member 3 securely, and the magnetic material 4 is disposed around the superconducting wire materials 1. A low thermal conductivity material such as stainless steel, or the like, is used as the material for the support member 3 in order to reduce the quantity of penetration of heat into a low temperature end portion. Further, the magnetic material 4 is disposed only in a partial region of the high temperature side. This reason is in that the lowering of the critical current value on the high temperature side is improved and that the magnetic material is not disposed on the low temperature side so as to reduce the quantity of penetration of heat, as described above.

(Example 1)

Using a bismuth type material $Bi_2Sr_2Ca_2Cu_3O_X$ as a superconducting material, a tape-like superconducting wire material having a sectional size of 5 mm wide and 0.3 mm thick and having substantially a 2.5:1 sectional area ratio of silver to the superconducting wire material was produced. The critical current value of the superconducting wire material as a single material was about 70 A at a temperature of 77 K. Eight superconducting wire materials thus produced were laminated to form one unit. The critical current value of the unit as a single unit did not take eight times as large as the critical current value of the single wire but exhibited 390 A. When 24 units thus formed were disposed on a 60 mm-diameter stainless steel cylinder so that the tape surfaces thereof were parallel with the circumferential direction, the critical current value per unit exceeded 450 A and increased by 15% compared with the critical current value of the single unit. The total critical current value exceeded 10 kA. That is, the lowering of the critical current value due to the self magnetic field was prevented so that stable current conduction could be made while the critical current value was kept high.

(Example 2)

A tape-like oxide superconducting wire material unit composed of lamination of eight single wires each having a sectional size of 5 mm×0.3 mm was produced in the same manner as in Example 1. The critical current value of the superconducting wire material unit was 390 A at a temperature of 77 K. On the other hand, by using stainless steel (in which the thermal shrinkage factor was −0.29% when cooled from the room temperature to 77 K) as the support member, the superconducting wire material units were fixed and the critical current value thereof was measured at the temperature of 77 K. As a result, the critical current value increased to 420 A. Here, the sectional area proportion of the support member, silver and the superconductor was set to be 3:2.5:1. Accordingly, when such a support member was used, it was apparent that the critical current value increased compared with the case of no support member.

As described above, the effects according to the present invention are as follows.

(1) Because units each of which is composed of a tape-like oxide superconducting wire material are formed in such a manner as stated above, a superconducting current lead in which deterioration of the critical current value due to the self magnetic field is suppressed so that stable current conduction can be made is obtained. Furthermore, there arises an effect that the temperature rising at the time of quenching of the superconductors is minimized. In addition, when the support member is formed from a low thermal conductivity material, the quantity of penetration of heat into the low temperature portion can be reduced more greatly.

(2) Further, when the support member is formed from a magnetic material, the deterioration of the critical current value due to the self magnetic field can be Suppressed so that a superconducting current lead subjected to stable current conduction can be formed.

(3) Further, when the support member is composed of a magnetic material disposed on its high temperature side, and a low thermal conductivity material disposed on its low temperature side, not only the deterioration of the critical current value due to the self magnetic field can be suppressed but also the quantity of penetration of heat into the low temperature end portion can be suppressed. Accordingly, a current lead low in the quantity of penetration of heat can be formed.

(4) Further, when a magnetic material is used as the Support member and disposed so as to surround the superconductors, the deterioration of the critical current value due to the self magnetic field can be suppressed more effectively.

(5) Further, when configuration is made as stated in claim 5, the deterioration of the critical current value due to the self magnetic field can be suppressed more effectively and, furthermore, the quantity of penetration of heat into the low temperature end can be suppressed.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the inventions The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A superconducting current lead, comprising:

a cylindrical support member; and a plurality of superconducting wire material units, each of said plurality of superconducting wire material units being fixed onto said support member and being made of a tape-like oxide superconducting wire material, each of said plurality of superconducting wire material units having a tape surface;

wherein said tape surfaces of said plurality of superconducting wire material units are disposed in parallel with a circumferential direction in a cylindrical coordinate system, and at least a portion of said cylindrical support member is formed from a magnetic material, and wherein said support member has a high temperature side and a low temperature side, said magnetic material being disposed on the high temperature side, and a low thermal conductivity material being disposed on the low temperature side, said low thermal conductivity material being connected to said magnetic material.

2. A superconducting current lead, comprising:

a cylindrical support member; and a plurality of superconducting wire material units, each of said plurality of superconducting wire material units being fixed onto said support member and being made of a tape-like oxide superconducting wire material, each of said plurality of superconducting wire material units having a tape surface;

wherein said tape surfaces of said superconducting wire material units are disposed in parallel with a circumferential direction in a cylindrical coordinate system, and at least a portion of said cylindrical support member is formed from a magnetic material, and wherein said support member is disposed at an outer circumferential side of said superconducting wire material units.

3. A superconducting current lead, comprising:

a cylindrical support member; and a plurality of superconducting wire material units, each of said Plurality of superconducting wire material units being fixed onto said support member and being made of a tape-like oxide superconducting wire material, each of said Plurality of superconducting wire material units having a tape surface;

wherein said tape surfaces of said superconducting wire material units are disposed in parallel with a circumferential direction in a cylindrical coordinate system, and at least a portion of said cylindrical support member is formed from a magnetic material; and, an additional magnetic material layer, said additional magnetic material layer surrounding said support member and said superconducting wire material units.

\* \* \* \* \*